March 28, 1939. J. V. SLADE Re. 21,039
METHOD OF GRINDING
Original Filed Oct. 14, 1932 3 Sheets-Sheet 1
FIG. 1.
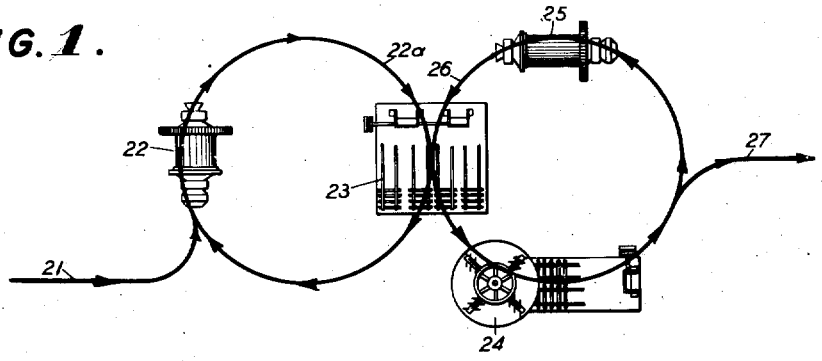
FIG. 3.
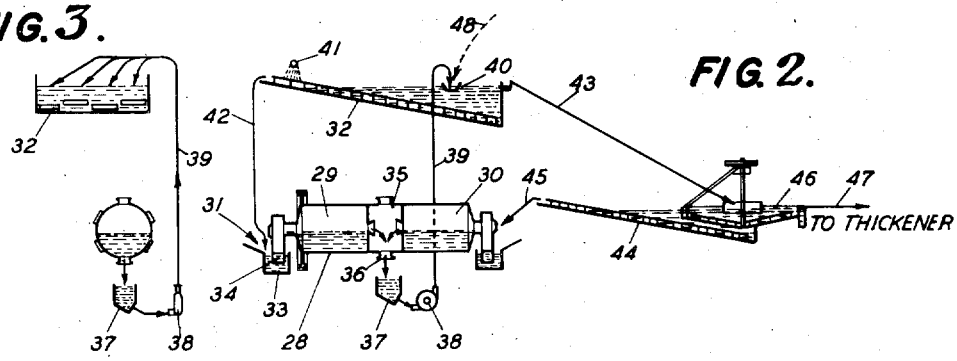
FIG. 2.
INVENTOR
JAMES V. SLADE
BY Arthur Nicholson
ATTORNEY

METHOD OF GRINDING

Original Filed Oct. 14, 1932 3 Sheets-Sheet 2

INVENTOR
JAMES V. SLADE
BY Arthur Nicholson
ATTORNEY

March 28, 1939. J. V. SLADE Re. 21,039

METHOD OF GRINDING

Original Filed Oct. 14, 1932 3 Sheets-Sheet 3

INVENTOR.
JAMES V. SLADE
BY Arthur Nicholson
ATTORNEY

Reissued Mar. 28, 1939

Re. 21,039

UNITED STATES PATENT OFFICE 21,039

METHOD OF GRINDING

James V. Slade, New Rochelle, N. Y., assignor to The Dorr Company, Inc., New York, N. Y., a corporation of Delaware Original No. 2,052,426, dated August 25, 1936, Serial No. 637,696, October 14, 1932. Reissue No. 20,941, dated December 6, 1938, Serial No. 226,039, August 23, 1938. This application for reissué February 1, 1939, Serial No. 254,071

16 Claims. (Cl. 83—94)

Figure 4:
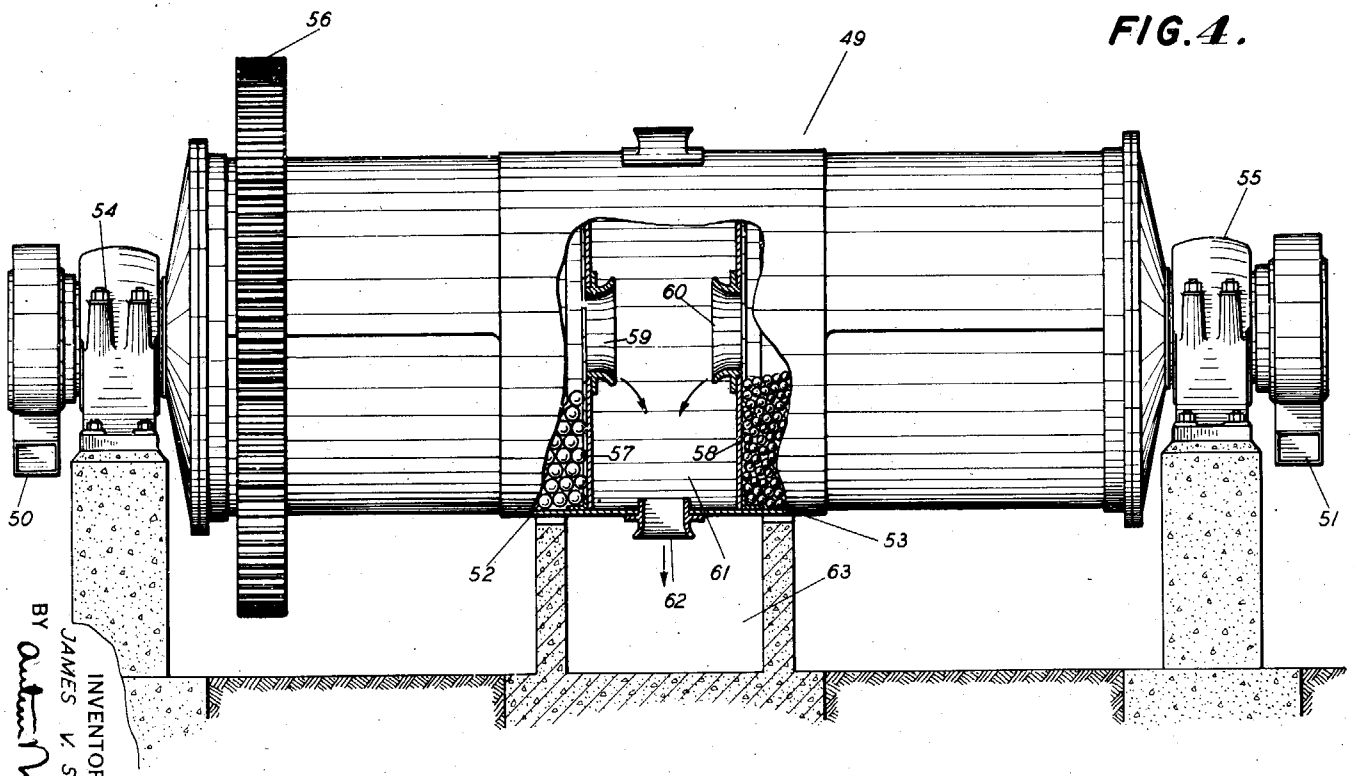

This invention relates to improvements in grinding systems, more particularly the two stage closed circuit system which is more or less standard in the metallurgical industry and also used in the non-metallic mineral industry, for instance in the cement industry.

One object of this invention is to provide greater flexibility of operation in a closed circuit two stage grinding system. More specifically this means rendering more positive and flexible, the operation of the primary classifier, which heretofore has labored under certain shortcomings.

Other objects are to simplify the plant layout and to eliminate certain heretofore bothersome restrictions in the way of mechanical arrangements, and to increase the degree of efficiency and utilization of existing machinery.

These and other advantages are obtained by a change in the flow sheet or hook up, featuring essentially the return of part or all of the secondary mill discharge to the primary classifier. The nature of this arrangement will be better understood when it is recalled that a standard flow sheet for closed circuit grinding generally includes a primary and a secondary closed grinding circuit with each circuit including a bill and an associated classifier. Both circuits operate in series, with the overflow from the primary classifier feeding into the secondary circuit or secondary classifier. The invention may also be said to consist in utilizing material obtained from one stage to control and improve the operation of the preceding stage.

Standard equipment called for by this flow sheet comprises a ball or rod mill for coarse grinding in the primary circuit, and another mill for fine grinding in the secondary circuit. For proper operation of the system the primary classifier must separate undersize particles up to a certain desirable size, which may be called the intermediate size. This is the size of material which is transferred together with finer sizes to the secondary cycle for fine grinding.

That intermediate size is not always readily or positively obtainable in the ordinary run of rake classifiers owing to the fact that the separation in the classifier depends upon a variety of factors such as rake speed, the amount of wash water used, the dilution of the pulp, and upon the area of the classifier bath from which the overflow or undersize is withdrawn. In other words the character of the separation depends upon what in the pertinent terminology is called the "overflow capacity" of the classifier, and which may be defined as the tonnage of undersize solids up to a certain mesh size which the machine is capable of delivering free or substantially free from oversize.

Since the above factors have bearing upon each other and upon the classifier operation, they cannot be freely and individually changed for the purpose of controlling the "overflow capacity" without imposing other difficulties and limitations upon the classifier operation.

The operator tries to correct such discrepancies in various ways. One tendency is to operate the classifier at increased speeds to try to keep the bath better agitated to hasten its selective action which may lead to an otherwise undesirable excess of speed. Another tendency is to reduce the amount of liquid passing through the classifier to reduce the dilution, which increases the buoyancy action upon the intermediate size of solids, at which procedure he may run to a point at which proper selectivity is lost. Moreover, while this reduction of liquid contents produces a bath of excessive specific gravity and viscosity, it also imposes certain limitations upon the amount of spray water allowable, which in turn results in a rake product of insufficient cleanliness.

The primary classifier is required to separate a desired undersize of solids in the overflow (intermediate plus finer sizes) for further treatment in the secondary circuit, and further to have sufficient raking capacity in order to handle the necessary amount of circulating load. In other words the classifier must be selective in certain ways but its selectivity must not be such that it makes its reaction felt upon other phases of the classifier operation. So there are two antagonistic factors to be reconciled in this machine.

Still in other words the difficulty is that the demand for a certain raking capacity results in a greater width of the classifier which in turn influences the "overflow capacity", tending to produce a much finer separation than desired for intermediate size.

Still another factor may tend to render difficult the proper coarse separation in the primary classifier, namely a certain minimum amount of circulating liquid is required for the proper operation of the ball mill, and this required minimum liquid under some circumstances exceeds the amount desirable for the separation of the intermediate size in the classifier overflow. On the other hand this minimum amount of water may have to be augmented by extra water added to the mill feed if the discharging rake product or sands from the classifier are too dry. In the latter case a considerable increase in rake speed is the only remedy if the desired separation of the intermediate size through the classifier overflow is to be obtained.

Assuming the operator has succeeded in adjusting satisfactorily the operation of the primary cycle under such diverse requirements, and no considerable changes in the feed size occur, the primary classifier overflow enters the feed well of the secondary classifier, which is preferably a bowl classifier. The difference in the function of the two classifiers should here be noted. The primary classifier is pressed into a service for causing the separation of fines plus certain solids of a desired intermediate size, with an attendant excess of "overflow capacity". As this overflow enters the bowl of the secondary classifier it encounters a deliberately increased overflow capacity in the form of the enlarged circular overflow launder of the bowl, which produces the very fine separation desired. This overflow constitutes the final product from this flow sheet. The material of intermediate size is raked out by the classifier and circulated through the secondary grinder or tube mill to be reduced to said final size, and then to be separated out upon its return to the bowl of the secondary classifier. The final slurry is usually dewatered in a thickener from which the sludge may be further treated in a vacuum filter.

The connection between two such circuits may be said to be a bottle neck of the operation. This means that it is difficult not only to adjust each circuit for proper and efficient operation and cooperation of the machine units within itself, but it is also difficult to tune up properly the cooperation of the two circuits with each other, particularly in view of fluctuations in the amount and size of the fresh feed thereto. As a consequence of said fluctuations, one circuit may be overloaded, as would appear from an excess of material loading down the rakes, while the other circuit may operate below capacity. The difficulty therefore, is found in a certain lack of flexibility within the system, and which is further aggravated where each circuit, and the connection between the circuits requires a pump for maintaining the transit of the material.

Pumps in such operation may form a source of trouble in that they are subject to heavy wear and tear due to the abrasive and coarse character of the charge. Moreover, irregularities in their operation may cause sudden surges which are liable to upset certain desirable quiescent flow conditions, as for instance, in the sensitive feed to the bowl of the secondary classifier. Also the character of some materials may preclude the use of pumps altogether.

Difficulties are furthermore encountered in the practical layout of such plants, in that very careful consideration must be given to the relative elevations and locations of the various machine units to effect the proper transit of the material. Various kinds of mechanical elevators and special feeders must frequently be resorted to in order to carry the material from one step of the operation to the next, when the dilution of the material and amount of coarse material therein, as in the primary circuit, precludes the use of otherwise convenient and desirable pump arrangements.

One main feature of this invention serving to overcome the difficulties enumerated, lies in the fact that in a suitable manner an auxiliary volume of slurry is made available from the process and introduced into the bath of the primary classifier, so that it can be said that the primary classifier is operated with a tonnage in the overflow which is greater than the tonnage of new feed entering the primary cycle.

The invention thus comprises the control of overflow capacity in the primary classifier by the return of slime values thereto to aid coarser separation in that step, but also the return if desirable of relatively coarse material from the secondary grinding step to the primary cycle for the purpose of load regulation in the grinding stage.

Hence the embodiment herein shown provides for returning or by-passing material discharge from the secondary mill, through the primary classifier instead of direct to the secondary classifier.

Furthermore, as a consequence of the above changes of operation this invention makes the use of pumps more generally possible and their operation positive, thereby displacing expensive elevators, and other bulky and unhandy arrangements.

Numerous advantages as hereinafter described are the result of the improved arrangement according to this invention.

Figure 5:
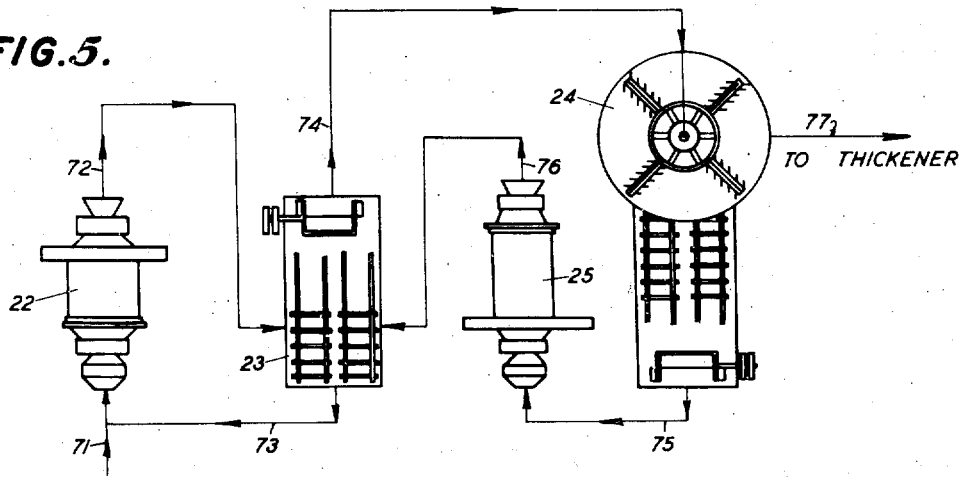
Figure 6:
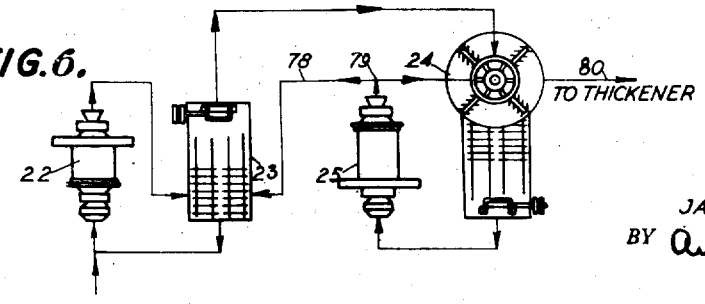

The manner of carrying out this invention may be understood by referring to the accompanying drawings in which Figure 1 is a diagram showing the present improvement over a standard system. Figure 2 is the side elevation, systematically shown of a practical arrangement of the improved system. Figure 3 is a cross sectional view taken upon Figure 2, disclosing the comparatively large width of the primary classifier and the distribution of the feed thereto. Figure 4 is a detail showing of a mill unit including the primary and the secondary mill combined. Figure 5 is a corresponding duplication of the showing of Figure 1, merely illustrating the improvement in a somewhat different and more conventional manner. Figure 6 shows a modification or compromise in that only a portion of the material from the secondary cycle is by-passed through the primary classifier or circuit.

The flow sheet of the standard system includes a primary operating cycle or circuit and a secondary operating circuit, each including a wet operating mill and classifier in closed circuit. Fresh feed enters the circuit, passes through the primary or coarse grinding mill from which a coarsely ground mixture is discharged, to be sent into the primary classifier, where the coarse matter is separated through the rake discharge while an intermediate size plus fines is discharged through the overflow. The primary rake product is returned to the primary feed, thus closing the primary grinding cycle. The returning material constitutes the so called circulating load in closed circuit grinding.

The overflow from the primary classifier contains intermediate and fine sized material, which is transferred into the secondary grinding cycle, by way of feeding it into the secondary classifier which latter according to standard practice is the bowl type of classifier. In the secondary classifier, the intermediate size is separated through the rake discharge and removed, and after passing through the secondary mill is circulated back into the bowl feed, thus closing the secondary cycle. The overflow from the bowl contains the fines which are delivered from the system as a final product indicated in the form of a thin pulp or slurry.

The improved arrangement of this invention is shown in diagram numbered Figure 1. Instead of tying the two cycles or circuits together with a feed line between the primary and the secondary classifiers it is to be noted that in Figure 1 the primary and the secondary circuits merge into each other as both mill discharges feed into the pool of the primary classifier, thus eliminating the usual bottle neck and attaining many other advantages explained hereinafter.

In Figure 1, fresh feed 21 enters the primary mill 22. Upon leaving the mill as indicated at 22a the material is separated in the primary classifier 23 where the coarse solids are caused to leave through the rake discharge in order to re-enter the primary mill, thus closing the primary circuit, while intermediate sized particles and fines escape to enter the secondary circuit as they feed the secondary or bowl classifier 24. There again separation takes place, with intermediate sized solids leaving the rake discharge towards the secondary mill 25. The discharge from the secondary mill as indicated at 26 joins the primary mill discharge 22a in feeding the primary classifier 23. Final fine size as overflows from the bowl leaves the secondary circuit as indicated at 27.

The arrangement in Figure 2 includes the mill unit 28 comprising a primary and a secondary mill or compartments 29 and 30 respectively. Fresh feed 31 plus returned circulating load from a primary classifier 32 enters a feed container 33 from which a customary scoop or spiral feeder 34 may feed it into the primary grinding compartment of the unit. Discharge from the primary and from the secondary compartment join in a common discharge chamber 35 between the compartments and leaving the mill in the direction of the arrows through openings 36 in the drum to drop into a sump 37 below the mill from which a pump 38 lifts it through riser 39 to the feed through 40 of the primary classifier 32. The primary classifier has a customary washing spray 41 for the rake product, and is elevated substantially above the mill unit high enough to allow the rake product to gravitate at 42 to the primary mill feed, and the primary classifier overflow 43 to gravitate to feed a secondary classifier 44 which latter again is located high enough to allow its rake product to gravitate at 45 to the secondary mill feed. The overflow from the bowl 46 of the secondary classifier constitutes the final product to be delivered from the grinding system, as indicated at 47.

An alternative manner of introducing the fresh feed is indicated in dot and dash at 48 where fresh feed may enter the feed trough 40 of the primary classifier 32.

Figure 4 shows more clearly and in detail a preferred embodiment in which the primary and the secondary mill are combined in one rotary ball mill unit 49. The showing is intended to convey merely the feature that separate feeds enter at each end of the drum unit, and combined leave a common central discharge chamber. The feeds enter for instance by way of scoop members or feeders 50 and 51 through hollow trunnions into a primary and a secondary grinding compartment 52 and 53 respectively of the drum unit. The ends of the drum are shown to be supported in bearings 54 and 55. A gear 56 surrounding the circumference of the drum indicates the drive. The primary compartment is indicated as having large sized grinding balls for coarse grinding and the secondary compartment as having smaller sized balls customary for fine grinding. At their inner ends the compartments are confined by partitions 57 and 58 having central discharge openings 59 and 60 from which the material is delivered into a central discharge chamber 61 and through peripherally arranged openings 62 in the drum out into a sump 63.

It is noted that with this improvement the bottle neck is eliminated, in that the two circuits merge directly into each other with the bath or pool of the primary classifier forming the junction.

While the elimination of the bottle neck between the circuits is most clearly illustrated in the largely diagrammatic showing of Figure 1, a more conventional showing of the flowsheets has been given in Figure 5. These figures correspond in substance exactly to the Figure 1, but afford a more accurate showing of the relative position of the machines with respect to the location of the respective inlets and outlets thereof.

Figure 5 illustrates the improvement upon the standard flow-sheet, analogous to Figure 1. The operation consists in feeding raw material at 71 to the primary mill 22, transferring the mill discharge 72 to the primary rake classifier 23, and allowing the rake product to gravitate back as at 73 to feed the mill, while the classifier undersize 74 goes to feed the bowl of the secondary classifier 24. Rake product 75 from the secondary classifier feeds the secondary or fine grinding mill 25, mill discharge 76 being returned over the primary classifier 23 to the secondary classifier 24. Of course the transfer of material in this flowsheet may be maintained by a single pump handling the combined discharges from both mills to feed the primary classifier, in a manner previously described in connection with Figures 2 and 3 (but here not shown). Final size leaves the bowl overflow at 77.

Fig. 6 shows a modification, or compromise between the flowsheets in Figure 5 or 1 respectively, in that it indicates that a portion of the material from the mill discharge is split off and returned to the primary classifier or circuit. In other words, a portion of the material obtained from the secondary mill discharge is by-passed through the primary classifier or circuit, whereby it should be understood that the split off portion may be selected according to size characteristics, or quantity proportion, depending upon what the specific requirement of operation be. Figure 6 is distinguished substantially only by the arrangement of a by-pass connection 78 between the secondary mill discharge and the primary classifier feed, branching off a portion of the secondary load at a splitting point indicated at 79. Final size leaves the system through bowl overflow at 80. No particular mechanism is indicated at this point, while it is to be understood that the split may be effected in various suitable ways. More broadly, this alternative arrangement brings within the scope of this invention the idea that a selected portion of the material in the secondary circuit may be returned to the primary classifier or primary circuit.

The practical advantages and consequences of this simple change of arrangement, are explained as follows: It was stated above that the excess overflow capacity of the primary classifier is responsible for the difficulties encountered in obtaining the desired separation of a certain intermediate size. With the return of the discharge from the secondary or tube mill to the primary classifier, the difficulty of separation is largely relieved. This return of secondary mill discharge constitutes an auxiliary volume of slurry available to create the desired overflow intensity in the primary classifier, and promotes the desired separation of the desired size of solids in the primary classifier, in that it helps to lift, buoy up and flow away, the desired intermediate size of particles. This beneficial effect, it will be understood, is due to the large proportion of fines or slimes in the secondary mill discharge. There is now produced a more intense flow over the weir, without excessive dilution due to the presence of the slimes.

Expressing this in terms of buoyancy, the properties of added slimes produces sufficient buoyant force to stimulate the separation. On the other hand, the amount of dilution may be balanced against a more liberal supply of spray or wash-water in the classifier whereby neither the thickness or viscosity of the bath nor the rake speed need be excessive, and a clean rake product may be obtained. In other words, the slime values and added tonnage in the primary classifier permit relatively higher dilutions for a given separation. Thus the operation of the primary classifier is rendered more flexible and free from disturbing factors.

While the present embodiment merely illustrates the return of material from the secondary mill discharge to the primary classifier, it should be understood that the added slime value in the primary classifier may also be produced from various other points or sources of the treatment process. For instance it may be represented by a recirculated portion of the primary classifier itself, by the overflow from the secondary classifier, or else by the sludge recovered from a final thickening step past the secondary clarifier, in which alternative cases it can be said that all the undersize returned to the primary classifier is finer than the critical mesh of separation in the primary classifier.

In the preferred embodiment of this invention, the secondary mill discharge together with the primary mill discharge is pumped to feed the primary classifier. This affords a three-fold advantage. First the need for two circulating pumps (one for each circuit) in the old system, is reduced to only one, thereby reducing the first or installed cost and simplifying the plant layout as well as its operation. This really means a saving of two pumps when considering that normally each pump requires a spare pump for such emergencies as would be expected when handling material difficult to pump and having abrasive qualities. Second, the lubricating effect of the added slimes upon the coarse sands obtained from the primary ball mill greatly improve the mechanical operation and the service of the pump proper. This means less wear together with more reliable and smoother running of the pump. Moreover it may mean that only thus is the use of a pump made possible at all. Third, the irregularities of the pump operation, manifesting themselves normally in sudden surges or the like, are now spread over and absorbed in the entire system. The importance of this point will be evident upon comparison with the old arrangement where individual pumps serve the primary and the secondary circuits. A surge in the pump of the secondary circuit would directly affect the sensitive overflow of the bowl of the secondary classifier, but with the improved one-pump arrangement, any surge therefrom is absorbed or dispersed through the bath or pool in the primary classifier which is interposed between the pump and the bowl. Furthermore, any possible surge is smoothed out through the otherwise improved operation of the pump itself.

Due to the new arrangement as shown, the two closed circuits are now much more intimately coupled with the effect that changes in the new feed are more readily distributed over both circuits, instead of overloading or choking one circuit, and leaving the other more or less idle. Through the medium of the combined mill feed to the primary classifier, the effects of such uneven loads are adjusted between the two circuits. To be more specific corresponding to a change or fluctuation in the new feed size, the separation of the intermediate size in the primary classifier can be varied between the practical limits of say 8 and 65 mesh, whereby disregarding the original feed size, the load can be juggled between the primary and the secondary circuit so that both mills and both classifiers will be evenly taxed. The control of such separation can be readily effected by a change in the amount of spray or wash liquid in, or of feed water to, the primary classifier, or else by a change in the classifier speed. In any case, the primary classifier forming the coupling between the two circuits will equalize or absorb the shocks from feed and other fluctuations. Thus can be obtained the desired even load distribution between the primary and the secondary mill which is vital for their efficiency, and the preservation of the grinding parts.

The flexibility in the system, giving opportunity for even load distribution between the primary and the secondary mill offers a specific advantage in the shutting down operation of the mill. In case of a shut-down for overhauling or repair, it is desirable to remove from the system a large portion of the material normally in transit, before stopping operation of the plant. After stopping the feed, the system then has to be allowed to run the circulating load down to a certain minimum, which under ordinary conditions means that the first circuit is depleted while the second is still operating under load. This involves the expenditure of considerable time for unproductive work, requiring sometimes an hour or more, and it is hazardous to run either mill under a greatly diminished load. Thanks to the flexibility afforded by the present improvement, it is now possible to maintain the load evenly distributed over both circuits, as the load diminishes equally in each circuit. In this way, the system is freed from the load within a much shorter time because both mills are working simultaneously upon the dwindling load. Both circuits can be kept in balance to exhaust the load in the classifier baths, which avoids having the primary mill running empty while waiting for the secondary mill to finish up.

Correspondingly, this arrangement also helps the starting up of the circuits, by permitting coarser temporary separation to bring up the secondary or tube mill load evenly or concurrently with the primary load, instead of running very light until after the primary circuit has built up a heavy load. Thus, both circuits may start evenly and be loaded up quickly by temporarily increasing the feed. Considerable savings of time can thus be attained, and the wear and tear of grinding parts in the mills be reduced.

Another practical consequence of great importance flows from this invention in cases where the primary and secondary mills are coupled as a unit. In this unit, the primary mill is bound to the secondary mill for coaxal rotation, and it is therefore desirable, if not vital, that both mills shoulder be under a load while running. Heretofore, such difficulty has been overcome only by discharging the load from the bowl or secondary classifier into a storage tank, and reusing the stored load when starting up again. This standby can be eliminated under the improved operation.

From the foregoing it can be seen that the primary classifier according to the novel arrangement constitutes what may be called the coupling between the primary and the secondary circuit, inasmuch as that classifier is closed circuited through the flow of its oversize or rake product with the primary mill, and on the other hand also closed circuited through its undersize or overflow product with the secondary mill cycle. Furthermore it can be seen that this classifier not only forms a cushion for relative irregularities or fluctuations in the circuits, but also offers a point control of the system by manipulating the operation of the classifier, furnishing means for shifting the bulk of circulating loads back and forth between the stages.

While all these advantages are derived from the relatively simple change in the flow sheet as explained there is inherent in the new hookup still another advantage discernible when the introduction of the new feed is slightly modified. This modification relates to introducing the new feed as at 48 in Figure 2 into the primary classifier feed which according to this invention comprises the primary plus the secondary mill discharge. Introducing the new feed which may be dry, into this ample feed volume gives an opportunity to thoroughly wet the same, and furthermore separating certain fines directly out of the new feed as it passes through the primary classifier, prevents the fines which are contained in some of the raw feeds in excess, from unnecessarily passing through the primary mill (into which ordinarily the new feed is first introduced).

According to one desirable arrangement, both mills may be located at substantially the same elevation, the mixture of both gravitating to a pump by which it is lifted through a riser pipe to the primary classifier located at a suitable height elevation. The rake product from this classifier is allowed to gravitate to the primary mill feed where it mingles with the new feed. The elevation of the primary classifier is high enough, not only to allow unhampered gravitation of the coarse to the mill feed, but also high enough to allow the classifier overflow to feed the bowl of the secondary classifier which in turn may discharge its rake product gravitationally into the secondary mill feed. Since the feed to the primary classifier, according to the improved operation is of greater volume and contains a relatively larger proportion of fines, it will be therefore more easily and evenly distributed over the classifier feed trough or inlet (see Figures 2 and 3) than was heretofore possible. This is particularly desirable where the classifier is of considerable width and capacity such as is often called for where high circulating loads are desired. The bowl overflow from the secondary classifier may feed a customary thickener (not shown) to dewater the final slurry.

The preferred embodiment also shows the use of a somewhat modified compartment mill unit. A standard compartment mill ordinarily used for two stage straight grinding has an arrangement for the separate disposal of each mill discharge, including a partition between both mill compartments, leaving discharge space on each side thereof, separate outlet means and separate sump and pump arrangements for each discharge. This is now replaced by a single discharge chamber of reduced size between the mills, eliminating the partition with a single sump below, and single pump, making the whole a simple and compact aggregate.

It will be readily seen that with pumping now rendered easy and reliable, the elevations and relative location of the various machine units of the system can be more liberally chosen; various types of mechanical feeders, elevators and the like can be eliminated; the mill designer having less restrictions on him can make better use of, and adapt design more readily to given local conditions, at a reduced expense of layout and machinery involved.

I claim:

1. A method for closed circuit two stage grinding which comprises circulating new feed through a primary operating cycle including a wet coarse grinding stage and a wet classifying stage, returning the classified coarse product to the coarse grinding stage, advancing the intermediate product separated from said classifying stage into a secondary operating cycle including a wet fine-grinding stage and another wet classifying stage ahead of said fine grinding stage, discharging the fines separated from the secondary classifying stage for utilization; characterized by the steps of mixing discharge from the primary and from the secondary grinding stages, and returning the mixture to the primary classifying stage.

2. In a closed circuit two stage grinding system, the combination with a primary operating cycle including a coarse wet grinding mill, and a wet operating classifier; a secondary operating cycle including a wet fine grinding mill, and a wet operating classifier; of pump means and conduit connections therefor, arranged for transferring combined discharges from both mills to the primary classifier.

3. A method for closed circuit two stage grinding which comprises circulating new feed through a primary operating cycle including a wet coarse grinding stage and a wet classifying stage, returning the classified coarse product to the coarse grinding stage, advancing the intermediate product separated from said classifying stage into a secondary operating cycle including a wet fine grinding stage and another wet classifying stage ahead of said fine grinding stage, discharging the fines separated from the secondary classifying stage for utilization; characterized by the step of pumping combined discharge from the primary and the secondary grinding stage into the primary classifying stage.

4. A method for closed circuit two stage grinding which comprises circulating new feed through a primary operating cycle including a wet coarse grinding stage and a wet classifying stage, returning the classified coarse product to the coarse grinding stage, advancing the intermediate product separated from said classifying stage into a secondary operating cycle including a wet fine grinding stage and another wet classifying stage ahead of said fine grinding stage, discharging the fines separated from the secondary classifying stage for utilization; characterized by the step of pooling discharge from the primary and the secondary grinding stage in the primary classifying stage.

5. A method for closed circuit two stage grinding which comprises circulating new feed through a primary operating cycle including a wet coarse grinding stage and a wet classifying stage, returning the classified coarse product to the coarse grinding stage, advancing the intermediate product separated from said clasifying stage into a secondary operating cycle including a wet fine grinding stage and another wet classifying stage ahead of said fine grinding stage, discharging the fines separated from the secondary classifying stage for utilization; characterized by the fact that a mixture of discharge from the primary and from the secondary grinding stages is treated in the primary classifying stage, and that new feed is introduced together with circulating feed to the primary classifying stage.

6. A method for closed circuit two stage grinding which comprises circulating new feed through a primary operating cycle including a wet coarse grinding stage and a wet classifying stage, returning the classified coarse product to the coarse grinding stage, advancing the intermediate product separated from said classifying stage into a secondary operating cycle including a wet fine grinding stage and another wet classifying stage ahead of said fine grinding stage, discharging the fines separated from the secondary classifying stage for utilization; characterized by the fact that a mixture of discharge from the primary and from the secondary grinding stages is treated in the primary classifying stage, whereby combined flow from both grinding stages is pumped to the classifying stage, and that the intermediate overflow separation is allowed to gravitate from the primary classifying stage to the secondary classifying stage, and the secondary coarse separation to gravitate to the secondary grinding stage.

7. A method for closed circuit two stage grinding which comprises circulating new feed through a primary operating cycle including a wet coarse grinding stage and a wet classifying stage, returning the classified coarse product to the coarse grinding stage, advancing the intermediate product separated from said classifying stage into a secondary operating cycle including a wet fine grinding stage and another wet classifying stage ahead of said fine grinding stage, discharging the fines separated from the secondary classifying stage for utilization; characterized by the fact that a mixture of discharge from the primary and from the secondary grinding stages is treated in the primary classifying stage.

8. A method for wet grinding in stagewise operation, in which an operating stage comprises a step of wet grinding and a step of wet classifying, said steps to operate in closed circuit relation to each other with oversize material from the classifying step returning to the grinding step, delivering a slurry containing undersize material from said classifying step into another similar closed circuit operating stage and which comprises another wet grinding step and another wet classifying step, and reintroducing a controlled amount of the material reground in the latter circuit into the classifying stage of the preceding circuit.

9. A method for wet grinding in stagewise operation, in which an operating stage comprises a step of wet grinding and a step of wet classifying, said steps to operate in closed circuit relation to each other with classified oversize material returning to the grinding step, delivering a slurry containing undersize material from said classifying step into another similar closed circuit operating stage comprising another wet grinding step and another wet classifying step, and reintroducing into the first mentioned circuit an amount of slurry in transit in the latter circuit, containing undersize produced by the latter grinding step, said undersize in passing through the first mentioned classifying step being effective to change the dilution or viscosity of the slurry therein and thereby consequently changing the buoyancy of the slurry with respect to coarser particles, in order to effect the grade of separation desired in said first mentioned classifying step.

10. A method for wet grinding in stagewise operation, in which an operating stage comprises a step of wet grinding and a step of wet classifying, said steps to operate in closed circuit relation to each other with classified oversize material returning to the grinding step, delivering a slurry containing undersize material from said classifying step into another or later similar closed circuit operating stage comprising another wet grinding step and another wet classifying step, withdrawing from the process a slurry containing fines produced in the later circuit and reintroducing it into the earlier circuit, said fines in passing through the first mentioned classifying step being effective to change the dilution or viscosity of the slurry therein and thereby consequently increasing the buoyancy of the slurry with respect to coarser particles, in order to aid a desired coarser separation in said classifying step.

11. A system for stage closed circuit grinding comprising a wet grinding stage and a wet classifying stage operating in a primary closed circuit, and another wet grinding stage for further comminution of undersize material obtained from the overflow of the first-mentioned classifying stage and another wet classifying stage operating in circuit with said second grinding stage characterized by means for combining mill discharge from both grinding stages, and conveying means for introducing such mixture into the primary classifying stage to effect therein a redistribution of the proper and desired size solids from the mixture into and over the respective grinding circuits.

12. A closed circuit two-stage grinding system according to claim 13 and having in said circuits a primary and a secondary classifier respectively of the settled solids conveying or raking type with a rake product discharge and an overflow, and having correspondingly a primary and a secondary mill, in which system a pump lifts the combined mill discharges to the primary classifier located at an elevation above the mill feed, in which are provided means for allowing gravitational discharge of the rake product of the primary classifier to feed the respective primary mill, in which are also provided conduit means for gravitational feed of the primary classifier overflow to the secondary classifier; and in which are provided conduit means for gravitationally conveying secondary rake product to the feed of the secondary mill.

13. A system of stagewise closed circuit grinding which comprises a primary and a secondary closed circuit grinding arrangement for coarse grinding and fine grinding respectively, each such grinding arrangement including a wet grinder of the rotary drum type and a wet classifier of the mechanical agitating conveying type, a connection for the primary classifier effective to return oversize or rake product to the grinder of the primary circuit for coarse grinding, another connection for delivering undersize or overflow to the classifier of the secondary circuit, said grinders being structurally and coaxially combined to form grinding sections of a rotary drum unit and having interposed therebetween a discharge delivery space, each section having a feed arrangement for supplying respective circulating loads to the respective grinding sections, each section also having a discharge arrangement for ground material, means for combining the respective materials discharged from said grinding sections, means for returning the combined discharges to the classifier of the primary grinding arrangement, the size separation in said last mentioned classifier being controllable by controlling the operation of the classifier to effect a load distribution with regard to the grinding stages to enable each grinding section to be kept under a desired load while the unit rotates, as by the shifting of load, for instance, from the secondary grinding compartment to the primary grinding compartment of said rotary drum unit.

14. A method of stagewise closed circuit grinding in which the material passes through a primary and a secondary cycle, each cycle comprising a wet grinding and a wet classifying step coupled in a circuit, in which method discharge from the secondary grinding step is returned to the primary classifying step and in which portions of the grinding load are shiftable between said grinding stages, for instance, from the second to the first grinding stage, by effecting a control of size separation in said primary classifying stage.

15. A stagewise wet grinding system comprising a first grinding stage and a first classifying stage; a second grinding stage, and a second classifying stage; means for introducing new feed material into the system by way of the first grinding stage; means for transferring overflow from the first to the second classifying stage; means for re-cycling classified material from the first classifying stage to the one of said grinding stages; means for recycling classified material from the second classifying stage to the other of said grinding stages; and means for transferring material from the discharge of both grinding stages to the first classifying stage.

16. A method of stagewise wet grinding, which comprises grinding material to be treated in parallel operation in a first and in a second grinding stage; introducing new feed material into the system by way of the first grinding stage; transferring material from the discharging of both grinding stages to a first wet classifying stage; recycling classified material from the first classifying stage to the one of said grinding stages while transferring the overflow from that classifying stage to a second wet classifying stage; and recycling classified material from said second classifying stage to the other of said grinding stages.

JAMES V. SLADE.